(12) United States Patent
Kwon et al.

(10) Patent No.: US 10,614,579 B1
(45) Date of Patent: Apr. 7, 2020

(54) THREE DIMENSIONAL MODEL GENERATION USING HETEROGENEOUS 2D AND 3D SENSOR FUSION

(71) Applicant: The Boeing Company, Chicago, IL (US)

(72) Inventors: Hyukseong Kwon, Thousand Oaks, CA (US); Kyungnam Kim, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/157,012

(22) Filed: Oct. 10, 2018

(51) Int. Cl.
| | |
|---|---|
| *G06T 7/00* | (2017.01) |
| *G06T 7/30* | (2017.01) |
| *G06T 7/50* | (2017.01) |
| *G06T 17/05* | (2011.01) |
| *G06K 9/00* | (2006.01) |
| *G06T 3/00* | (2006.01) |
| *G06T 3/40* | (2006.01) |

(52) U.S. Cl.
CPC ............ *G06T 7/30* (2017.01); *G06K 9/00208* (2013.01); *G06T 3/0068* (2013.01); *G06T 3/4007* (2013.01); *G06T 7/50* (2017.01); *G06T 17/05* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 6,862,366 B2 | 3/2005 | Bhattacharjya | |
| 7,271,840 B2 | 9/2007 | Segman | |
| 9,182,487 B2* | 11/2015 | Troy | G01N 29/0654 |
| 9,449,227 B2 | 9/2016 | Chen et al. | |
| 9,858,640 B1* | 1/2018 | Earl | G06T 11/60 |
| 9,972,067 B2 | 5/2018 | Kwon et al. | |
| 2007/0031064 A1 | 2/2007 | Zhao et al. | |
| 2009/0141966 A1* | 6/2009 | Chen | G06T 19/006 |
| | | | 382/154 |
| 2013/0106849 A1 | 5/2013 | Ha et al. | |
| 2014/0132733 A1 | 5/2014 | Mundhenk et al. | |
| 2014/0376821 A1 | 12/2014 | Meir et al. | |
| 2015/0254857 A1 | 9/2015 | Huang et al. | |

(Continued)

OTHER PUBLICATIONS

Bradley Skinner,(3D Point Cloud Upsampling for Accurate Reconstruction of Dense 2.50 Thickness Maps (Year: 2014).*

(Continued)

*Primary Examiner* — Martin Mushambo
(74) *Attorney, Agent, or Firm* — Sage Patent Group

(57) ABSTRACT

A method for generating a 3D model point cloud of an object includes capturing a 2D image of the object and a 3D image of the object. The 3D image of the object includes a point cloud. The point cloud includes a multiplicity of points and includes a plurality of missing points or holes in the point cloud. The method additionally includes generating an upsampled 3D point cloud from the 3D image using local entropy data of the 2D image to fill at least some missing points or holes in the point cloud and merging a model point cloud from a previous viewpoint or location of a sensor platform and the upsampled 3D point cloud to create a new 3D model point cloud. The method further includes quantizing the new 3D point cloud to generate an updated 3D model point cloud.

20 Claims, 10 Drawing Sheets

(56) References Cited

U.S. PATENT DOCUMENTS

2016/0097858 A1     4/2016   Mundhenk et al.
2019/0004534 A1*   1/2019   Huang ................. G05D 1/0248

OTHER PUBLICATIONS

Mundhenk, T. Nathan, et al.; "Frame Rate Fusion and Upsampling of EO/LIDAR Data for Multiple Platforms," IEEE Conference on Computer Vision and Pattern Recognition Workshops, 2014, pp. 762-769.

Park, Jaesik, et al.; High-Quality Dedth Map Upsampling and Completion for RGB-D Cameras, IEEE Transactions of Image Processing, 2014, pp. 5559-5572, vol. 23.

Rusinkiewicz, Szymon, et al; "Efficient Variants of the ICP Algorithm," 3-D Imaging and Modeling, 2001, pp. 1-8.

Kwon, Hyukseong, et al.; "Improving 3D registration by upsampling of sparse point cloud through fusion with high-resolution 2D image," Proceedings of SPIE—Optical Engineering + Applications, 2017, pp. 1-9.

Wang, Ruisheng, et al.; "A New Upsampling Method for Mobile LiDAR Data," IEEE Workshops on Applications of Computer Vision, 2012, pp. 17-24.

Wong, Uland, et al.; "Camera and LIDAR Fusion for Mapping of Actively Illuminated Subterranean Voids," Field and Service Robotics, Springer, 2009, pp. 421-430, vol. 62.

\* cited by examiner

EO IMAGE

LIDAR DEPTH MAP

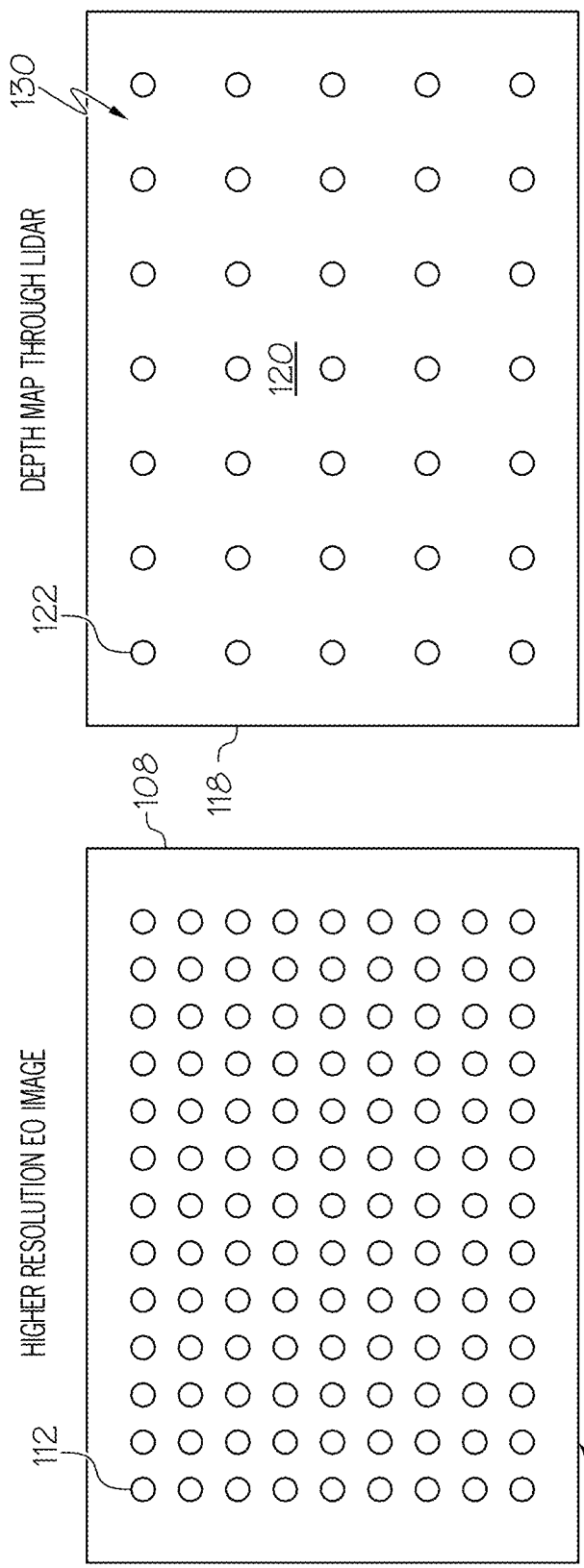

THREE DIMENSIONAL MODEL GENERATION USING HETEROGENEOUS 2D AND 3D SENSOR FUSION

CROSS-REFERENCE TO RELATED APPLICATIONS

The present application is related to U.S. patent application Ser. No. 15/290,429, filed Oct. 11, 2016, entitled "System and Method for Upsampling of Sparse Point Cloud for 3D Registration," now U.S. Pat. No. 9,972,067, which is assigned to the assignee as the present application and is incorporated herein by reference.

FIELD

The present disclosure relates to three dimensional (3D) model generation for performance of an operation with respect to an object and more particularly to three dimensional model generation using heterogeneous two dimension (2D) and three dimensional (3D) sensor fusion.

BACKGROUND

A three-dimensional (3D) model may be developed by acquiring a 3D image of an object using a 3D scanning technology such as, for example, light detection and ranging (LiDAR). The 3D image generated provides a point cloud that is a collection of points in a 3D coordinate system. Each point in the point cloud represents XYZ coordinates within the 3D coordinate system. Typically, the points within the point cloud represent the location of points on an exterior surface of the object and define a 3D model of the object. The 3D model may be used in performing an operation on the object, for instance, by a robot or other device. However, the 3D model represented by the point cloud often suffers from insufficient features on objects or feature detection discrepancy among images because of illumination changes. Such conditions may be particularly present with objects, such as satellites or other spacecraft, in space where illumination levels of the object may vary widely from one viewpoint to another. This results in incomplete 3D models with holes or missing information or data on surfaces. Accordingly, there is a need to fill-in as many holes as possible and generate a denser or more complete 3D model that is usable for performing an operation with respect to the object or for performing an operation on the object.

SUMMARY

In accordance with an embodiment, a method for generating a three dimensional (3D) model of an object includes capturing, by a two dimensional (2D) imaging sensor, a 2D image of the object. The 2D image includes a 2D image plane. The method also includes capturing, by a 3D imaging sensor, a 3D image of the object. The 3D image of the object includes a 3D point cloud. The 3D point cloud includes a multiplicity of points, and the 3D point cloud includes a plurality of missing points or holes in the 3D point cloud. The method additionally includes generating, by a processor, an upsampled 3D point cloud from the 3D image using local entropy data of the 2D image to fill at least some missing points or holes in the 3D point cloud and merging, by the processor, a 3D model point cloud from a previous viewpoint or location of a sensor platform and the upsampled 3D point cloud to create a new 3D model point cloud. The method further includes quantizing the new 3D model point cloud to generate an updated 3D model point cloud.

In accordance with another embodiment, a method for generating a three dimensional (3D) model of an object includes capturing, by a two dimensional (2D) imaging sensor, a 2D image of the object. The 2D image includes a 2D image plane. The method also includes capturing, by a 3D imaging sensor, a 3D image of the object. The 3D image of the object includes a 3D point cloud. The 3D point cloud includes a multiplicity of points, and the 3D point cloud includes a plurality of missing points or holes in the 3D point cloud. The 3D point cloud also includes a 3D depth map, wherein each of the points of the 3D point cloud includes depth information of a corresponding location on the object. The method also includes upsampling, by a processor, to generate an upsampled 3D point cloud from the 3D image using local entropy data of pixels within a predefined upsampling window. The upsampled 3D point cloud includes filled points for at least selected missing points or holes in the 3D point cloud. The method additionally includes generating, by the processor, multiple upsampled 3D point clouds from different viewpoints or locations of a sensor platform including the 2D imaging sensor and the 3D imaging sensor. The method further includes merging, by the processor, the multiple upsampled 3D point clouds to generate a 3D model point cloud of the object.

In accordance with a further embodiment, a system for generating a three dimensional (3D) model of an object includes a two dimensional (2D) imaging sensor for capturing a 2D image of the object. The 2D image includes a 2D image plane. The system also includes a 3D imaging sensor for capturing a 3D image of the object. The 3D image of the object includes a 3D point cloud. The 3D point cloud includes a multiplicity of points, and the 3D point cloud includes a plurality of missing points or holes in the 3D point cloud. The 3D point cloud also includes a 3D depth map, wherein each of the points of the 3D point cloud includes depth information of a corresponding location on the object. The system also includes a processor configured to perform a set of functions including upsampling to generate an upsampled 3D point cloud from the 3D image using local entropy data of pixels within a predefined upsampling window. The upsampled 3D point cloud includes filled points for at least selected missing points or holes in the 3D point cloud. The set of functions also includes generating multiple upsampled 3D point clouds from different viewpoints or locations of a sensor platform that includes the 2D imaging sensor and the 3D imaging sensor. The set of functions further includes merging the multiple upsampled 3D point clouds to generate a 3D model point cloud of the object.

In accordance with an embodiment and any of the previous embodiments, the method, system or set of functions further includes performing a process including moving the sensor platform to a next viewpoint or location relative to the object. The sensor platform includes the 2D imaging sensor and the 3D imaging sensor. The process also includes capturing, by the 2D imaging sensor, a subsequent 2D image of the object at a current viewpoint or location of the sensor platform and capturing, by the 3D imaging sensor, a subsequent 3D image of the object at the current viewpoint or location of the sensor platform. The subsequent 3D image of the object includes a subsequent 3D point cloud including a plurality of missing points or holes. The process also includes generating a current upsampled 3D point cloud for the current viewpoint or location of the sensor platform from the subsequent 3D image and using local entropy data of the subsequent 2D image to fill at least some of the plurality of missing points or holes in the subsequent 3D point cloud. The process additionally includes registering the updated 3D model point cloud from the previous viewpoint or location of the sensor platform with original points of the subsequent 3D point cloud without entropy based upsampling and merging the updated 3D model point cloud from the previous viewpoint or location of the sensor platform and the current upsampled 3D point cloud to create a current new 3D model point cloud. The process further includes quantizing the current new 3D model point cloud to generate a current updated 3D model point cloud for the current viewpoint or location of the sensor platform.

In accordance with an embodiment and any of the previous embodiment, the method or system additionally includes repeating the process for each of a set of viewpoints or locations of the sensor platform.

In accordance with an embodiment and any of the previous embodiments, the method, process or system further includes determining a homogeneous transform from the updated 3D model point cloud from the previous viewpoint or location of the sensor platform and the original points of a current 3D point cloud at the current viewpoint or location of the sensor platform without entropy-based upsampling using an iterative closest point process.

In accordance with an embodiment and any of the previous embodiments, the method, process or system also includes adjusting the current upsampled 3D point cloud to align or coordinate with the updated 3D model point cloud from the previous viewpoint or location of the sensor platform before merging using the homogeneous transform.

In accordance with an embodiment and any of the previous embodiments, the method, process or system further includes performing an operation with respect to the object.

In accordance with an embodiment and any of the previous embodiments, wherein performing an operation with respect to the object includes one of performing an autonomous space rendezvous; performing a proximity maneuver; performing a docking maneuver; or generating a 3D model of the object, wherein the object is a space object.

In accordance with an embodiment and any of the previous embodiments, the method, process or system additionally includes aligning the 2D image and the 3D image using pre-acquired calibration information.

In accordance with an embodiment and any of the previous embodiments, the method, process or system additionally includes assigning a depth value from each of a predetermined number of points in the 3D point cloud of the 3D image to respective matching pixels on the 2D image plane.

In accordance with an embodiment and any of the previous embodiments, the method, process or system also includes interpolating depth values for other pixels on the 2D image plane from the 3D point cloud of the 3D image.

In accordance with an embodiment and any of the previous embodiments, the method, process or system, wherein the interpolating includes using a predefined upsampling window around a currently processed pixel, and performing upsampling using the local entropy data of the pixels of the 2D image within the predefined upsampling window.

In accordance with an embodiment and any of the previous embodiments, the method, process or system further includes aligning the 2D image and the 3D image; assigning a depth value from selected points of the 3D point cloud or 3D depth map to a matching pixel on the 2D image plane; and interpolating depth values for other pixels on the 2D image plane within the predefined upsampling window.

In accordance with an embodiment and any of the previous embodiments, wherein merging the multiple upsampled 3D point clouds includes performing point cloud registration and quantization to generate the 3D model point cloud of the object.

In accordance with an embodiment and any of the previous embodiments, wherein merging the multiple upsampled 3D point clouds includes using an iterative closest point process to generate the 3D model point cloud of the object.

In accordance with an embodiment and any of the previous embodiments, wherein the 2D imaging sensor includes an electro-optical camera to capture a 2D electro-optical image and wherein the 3D imaging sensor includes a 3D Light Detection and Ranging (LiDAR) imaging sensor.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 4A is a diagram illustrating an example of resolution of the 2D image in accordance with an embodiment of the present disclosure.

FIG. 4B is a diagram illustrating an example of resolution of the 3D image or 3D point cloud compared to the 2D image including pixels in FIG. 4A in accordance with an embodiment of the present disclosure.

DETAILED DESCRIPTION

Figure 1A:
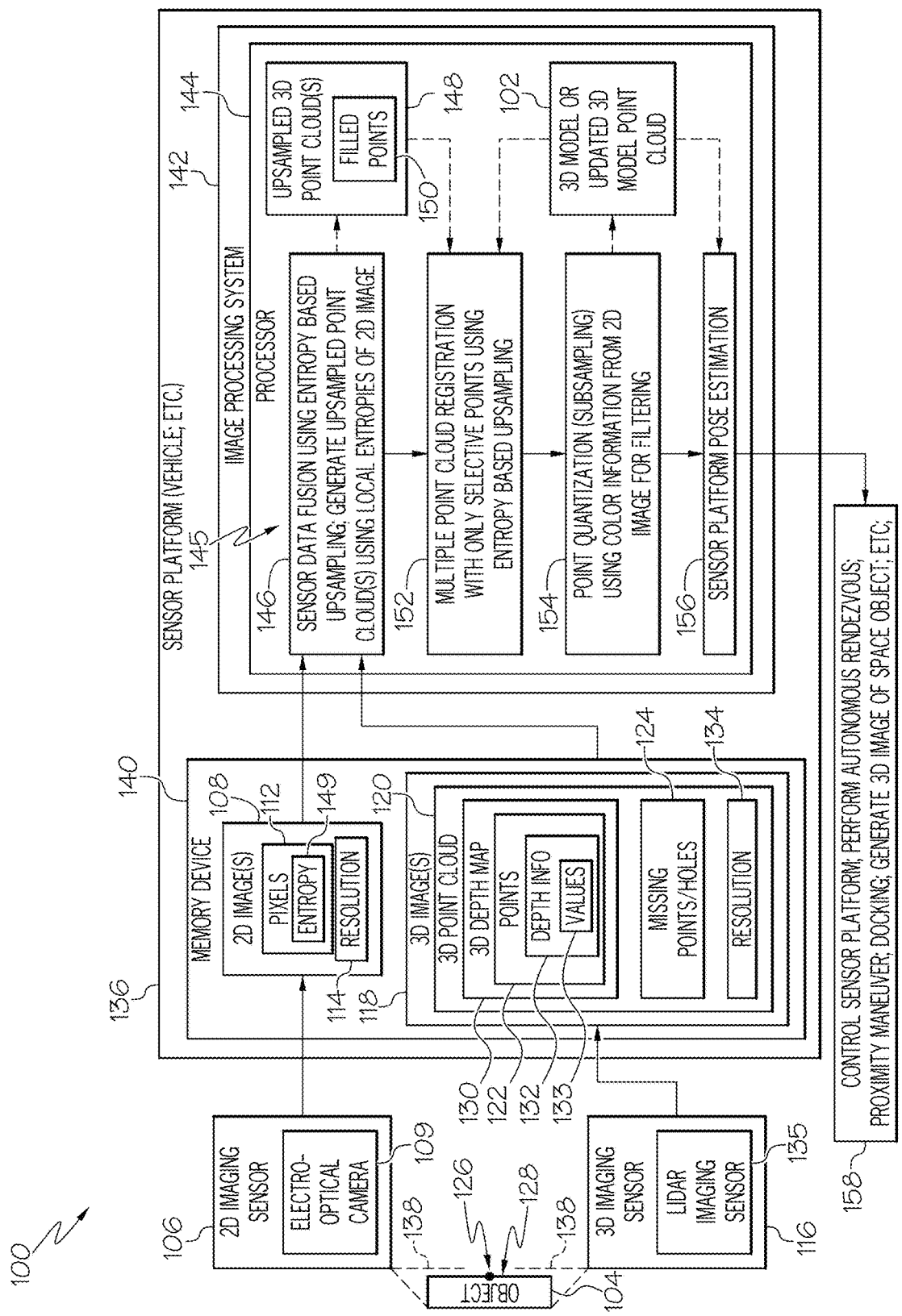
FIG. 1A is a block schematic diagram of an example of a system for generating a 3D model point cloud of an object in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Figure 1B:
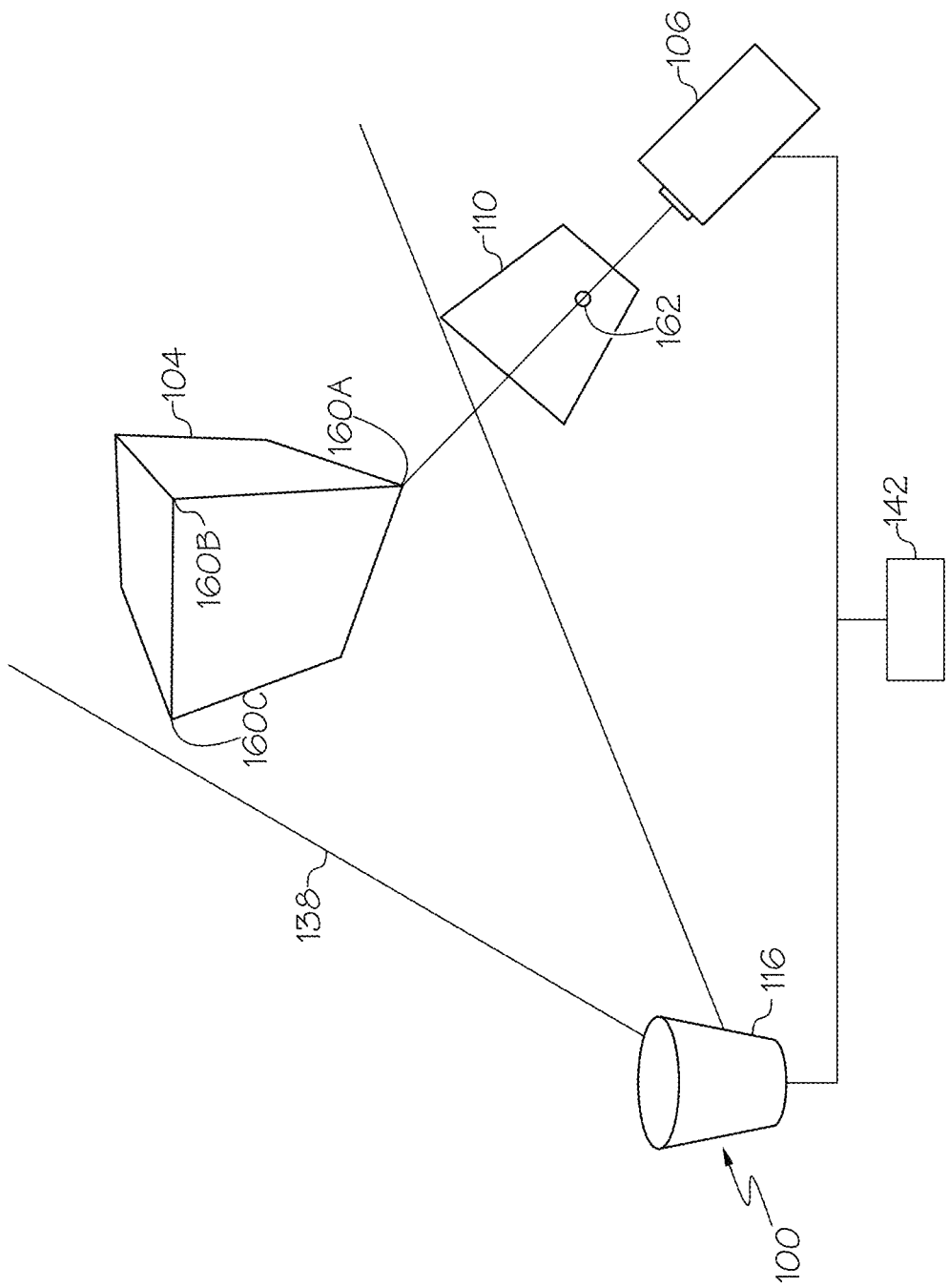
FIG. 1B is an illustration of the exemplary system of FIG. 1A showing an example of an image plane and using heterogeneous 2D and 3D sensor fusion in accordance with an embodiment of the present disclosure.

FIG. 1A is a block schematic diagram of an example of a system 100 for generating a 3D model point cloud 102 of an object 104 in accordance with an embodiment of the present disclosure. The 3D model point cloud 102 may also be referred to herein as simply the 3D model. The system 100 includes a two dimensional (2D) imaging sensor 106 for capturing a 2D image 108 of the object 104. An example of the 2D imaging sensor 106 is an electro-optical camera 109 that generated a high resolution 2D electro-optical image. Other examples of the 2D imaging sensor include any type device capable of generating a high resolution 2D image. The 2D image 108 includes a plurality of pixels 112 that provide a predetermined high resolution 114. The 2D image 108 also includes a 2D image plane 110 or is referenced in the 2D image plane 110 as illustrated in FIG. 1B.

The system 100 also includes a 3D imaging sensor 116 for capturing a 3D image 118 of the object 104. The 3D image 118 of the object 104 includes a 3D point cloud 120. The 3D point cloud 120 includes a multiplicity of points 122, and the 3D point cloud 120 includes a plurality of missing points 124 or holes that render the 3D point cloud 120 unusable as a 3D model point cloud for performing an operation with respect to the object 104. Each of the points 122 of the 3D point cloud 120 include corresponding location information or XYZ coordinate information of a corresponding location 126 on a surface 128 of the object 104. Accordingly, the 3D point cloud 120 includes or defines a 3D depth map 130 that includes the location or coordinate information of locations 126 or points on the object 104. Therefore, each of the points 122 of the 3D point cloud 120 includes depth information 132 or location information of the corresponding location 126 or point on the object 104. The depth information 132 includes depth values 133. The 3D image 118 or 3D point cloud 120 includes a resolution 134 that is less than the resolution 114 of the 2D image 108 as also illustrated and described with reference to FIGS. 4A and 4B. In accordance with an example, the 3D imaging sensor 116 is a Light Detection and Ranging (LiDAR) imaging sensor 135 or similar imaging sensor capable of generating a 3D image or 3D point cloud as described herein.

In accordance with an embodiment, the 2D imaging sensor 106 and the 3D imaging sensor 116 are associated with or mounted to a sensor platform 136. The sensor platform 136 is configured to move to different viewpoints 138 or locations to capture 2D images 108 and corresponding 3D images 118 at the different viewpoints 138 or location of the sensor platform 136. The multiple 2D images 108 and multiple 3D images 118 captured at different viewpoints 138 or locations of the sensor platform 136 are stored in a memory device 140. As described in more detail herein, the 2D image 108 data and the 3D image 118 data are combined or fused for each viewpoint 138 or location of the sensor platform 136 and the data for each of the viewpoints are combined or fused to generate the 3D model point cloud 102 or updated 3D model point cloud. In accordance with an embodiment, the sensor platform is a vehicle, such as a spacecraft or other type vehicle.

The system 100 also includes an image processing system 142. In at least one example, the memory device 140 is a component of the image processing system 142. The image processing system 142 includes a processor 144. The image processing system 142 or processor 144 is configured for generating a 3D model point cloud 102 of the object 104. The 3D model point cloud 102 is used to perform an operation on the object 104. The 3D model point cloud 102 is actually an updated 3D model point cloud that is generated by sensor data fusion or combining the 2D image 108 and the 3D image 118 at the same viewpoint 138 using entropy-based upsampling as described in more detail with reference to FIG. 4C. Accordingly, the image processing system 142 or processor 144 is configured to perform a set of functions 145 including in block 146 sensor data fusion from the 2D imaging sensor 106 and the 3D imaging sensor 116 or combining the 2D image 108 and a corresponding 3D image 118 at the same viewpoint 138. An upsampled 3D point cloud 148 is generated from the 3D image by upsampling using local entropy data 149 of pixels 112 of the 2D image 108 within a predefined upsampling window 402 in FIG. 4C. An example of using a predefined upsampling window 402 for upsampling using local entropy data 149 of the pixels 112 will be described in more detail with reference to FIG. 4C. The upsampled 3D point cloud 148 includes filled points 150 for at least selected missing points 124 or holes in the 3D point cloud 120 of the 3D image 118. Multiple upsampled 3D point clouds 148 are generated from different viewpoints 138 or locations of the sensor platform 136.

In block 152, registration of multiple point clouds 148 is performed with only selective points from the point clouds 148 and using entropy based upsampling. The points 122 that have lower entropies compared to other points 122 are selected because the lower entropy points 122 are more certain or there is more confidence in the depth information 132 or location information of these points 122 with the lower entropies compared to points 122 with higher entropies. An example of multiple point cloud registration is described in more detail in U.S. Pat. No. 9,972,067 and will be briefly described with reference to FIG. 1B.

In block 154, point quantization or subsampling is performed using color information from the 2D image 108 for filtering the registered upsampled 3D point clouds 148 to generate an updated 3D model point cloud or 3D model point cloud 102 of the object 104. In accordance with an embodiment, point quantization or subsampling is performed by selecting every Nth point in the entire set of points 122 and removing other points. The total number of points 122 in the 3D point cloud 120 will be reduced. Another (more computationally expensive) way of quantization is a grid-based method, where a 3D space is divided into a 3D cubic grid and a centroid point is calculated from all the points 122 within every unit grid cell. These centroid points are the quantized version of the original 3D point cloud 120. Accordingly, the multiple upsampled 3D point clouds 148 are merged to generate the updated 3D model point cloud or 3D model point cloud 102 of the object 104. The updated 3D model point cloud 102 is used in block 152 for registration with other 3D point clouds.

In block 156, the updated 3D model point cloud 102 is used for sensor platform pose estimation. The sensor platform pose estimation means the relative distance and orientation of the sensor platform 136 with respect to the object 104 that can be used for approaching, manipulation, or rendezvous.

In block 158, the sensor platform 136 is controlled using the sensor platform pose estimation 156 and/or 3D model point cloud 102 of the object 104. The 3D model point cloud 102 is used to perform an operation with respect to the object 104. Examples of controlling the sensor platform 136 and/or performing an operation with respect to the object 104 include but is not necessarily limited to performing an autonomous rendezvous between the sensor platform 136 or space vehicle and the object 104, performing a proximity maneuver by the sensor platform 136 relative to the object 104, performing a docking maneuver between the sensor platform 136 or space vehicle and the object 104 which is another space vehicle or generate a 3D image of the object 104 which is a space object such as an asteroid or other space object.

FIG. 1B is an illustration of the exemplary system of FIG. 1A showing an example of an image plane and using heterogeneous 2D and 3D sensor fusion in accordance with an embodiment of the present disclosure. In order to synchronize or align the 3D image 118 or 3D point cloud 120 with the 2D image 108 by the processor 144 or image processing system 142, a calibration procedure between the 3D point cloud 120 and the 2D image 108 is performed by the processor 144 or image processing system 142 to determine the relative poses of the 3D point cloud 120 and the 2D image 108. Synchronizing or aligning the 3D image 118 or 3D point cloud 120 with the 2D image involve fusion or combining the data from the 2D imaging sensor 106 and the 3D imaging sensor 116 for the same viewpoint 138 or location of the sensor platform 136, which is also referred to as heterogeneous 2D and 3D sensor fusion. In one aspect, the image processing system 142 is configured to determine a feature point 160A of the object 104 within the 3D point cloud 120 as well as a corresponding pixel location 162 in the image plane 110 of the 2D image 108 which corresponds to the feature point 160A as shown in FIG. 1A. As can be seen, the feature point 160A corresponds to the pixel location 162 on the image plane 110 (e.g., the two dimensional projection of a 3D scene onto a two dimensional image captured by the 2D imaging sensor 106). In one aspect, the image processing system 142 or processor 144 is also configured to determine a predetermined number of feature points 160A-C (or common points) in the 3D point cloud 120 and the corresponding pixel locations to each respective feature points 160A-C on the image plane 110 of the 2D image 108 captured by the 2D imaging sensor 106. For the purposes of this application, two or more pairs of feature points 160A-C in the 3D point cloud 120 and corresponding pixel locations on the image plane 110 are determined by the image processing system 142 or processor 144. Since each of the feature points 160A-C in the 3D point cloud 120 (e.g., the 3D depth map 130) provide a 3D location (e.g., provides a depth value of the point), the 3D point cloud 120 provides the image processing system 142 or processor 144 with the depth value or 3D location information for each of the corresponding pixels 112 to the feature points 160A-C on the image plane 110.

Figure 2:
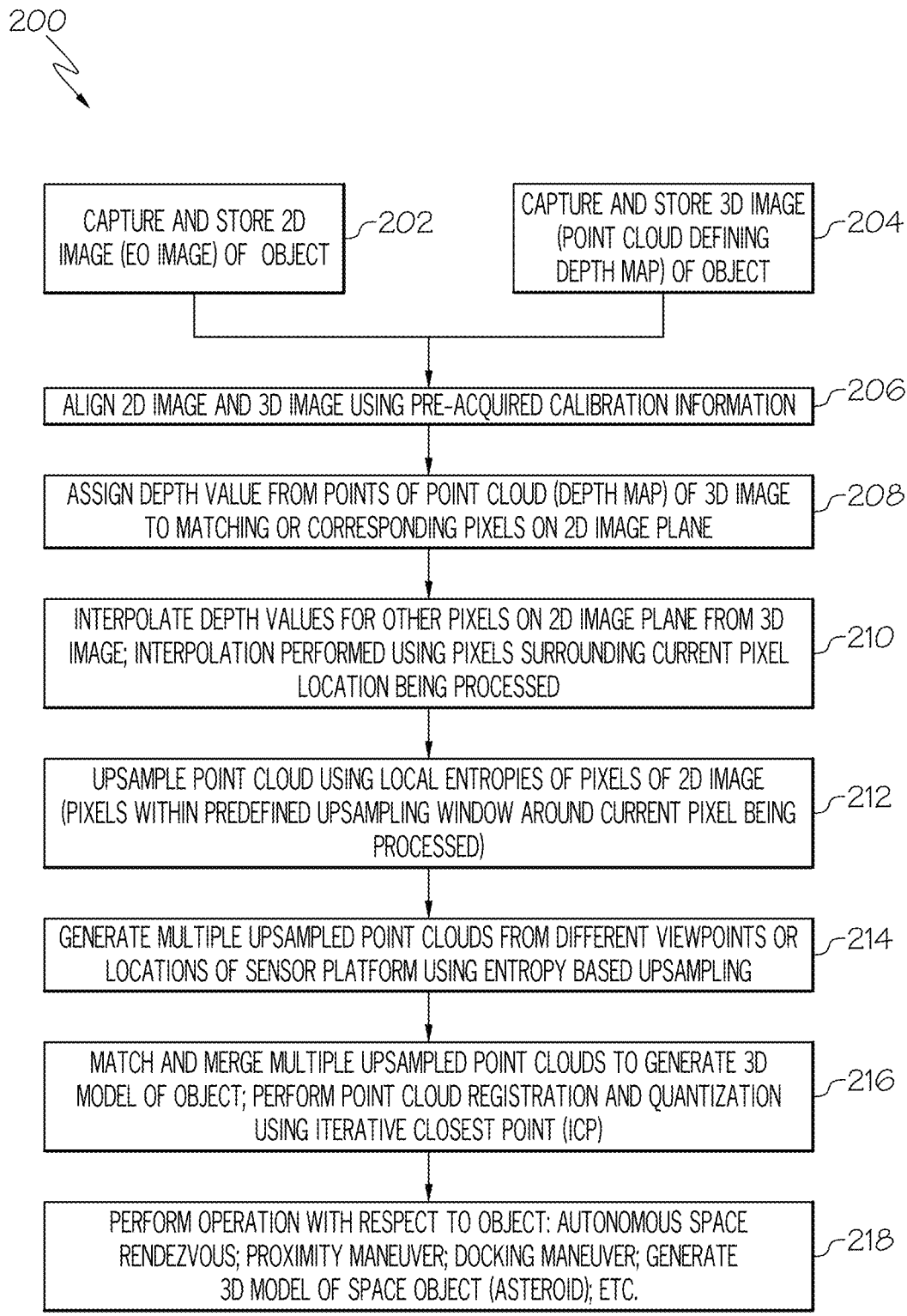
FIG. 2 is a flow chart of an example of a method for generating a 3D model point cloud of an object in accordance with an embodiment of the present disclosure.

FIG. 2 is a flow chart of an example of a method 200 for generating a 3D model point cloud of an object in accordance with an embodiment of the present disclosure. In accordance with an embodiment, the method 200 is embodied in and performed by the system 100 in FIGS. 1A and 1B. For example, the set of functions 145 includes the method 200. As described herein, generating the 3D model point cloud includes generating the 3D model point cloud using heterogeneous 2D and 3D sensor fusion in that data from the 2D imaging sensor 106 is combined or fused with data from the 3D imaging sensor 116 for the same viewpoint 138 or location of the sensor platform 136.

Figure 3A:
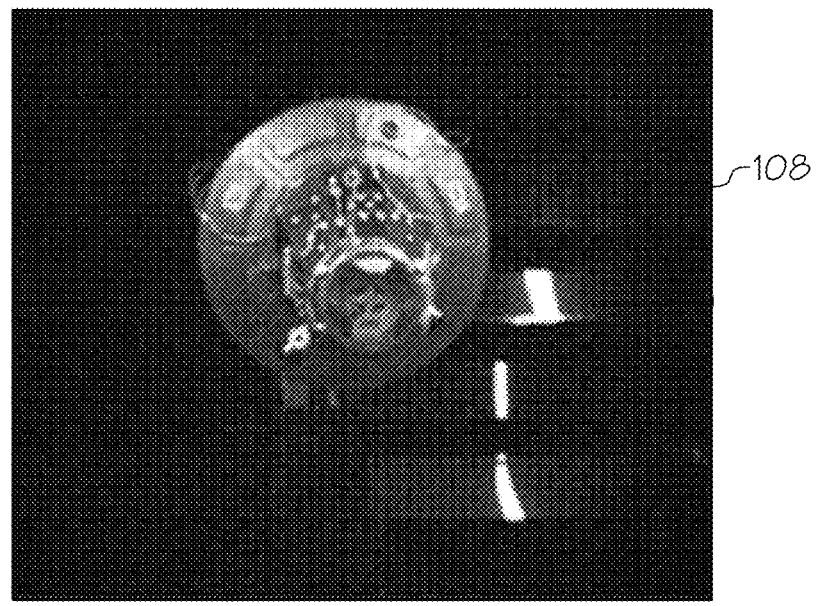
FIG. 3A is a diagram of an example of 2D image or a 2D electro-optical (EO) image of the object in accordance with an embodiment of the present disclosure.

In block 202, a 2D image of the object is captured by a 2D imaging sensor, such as 2D imaging sensor 106 in FIG. 1A. In accordance with an example, the 2D imaging sensor is an electro-optical camera and the 2D image is a 2D electro-optical (EO) image of the object. The 2D image includes a 2D image plane, for example, 2D image plane 110 in FIG. 1B. Referring also to FIG. 3A, FIG. 3A is a diagram of an example of a 2D image 108 or 2D electro-optical (EO) image of the object 104 in accordance with an embodiment of the present disclosure.

Figure 3B:
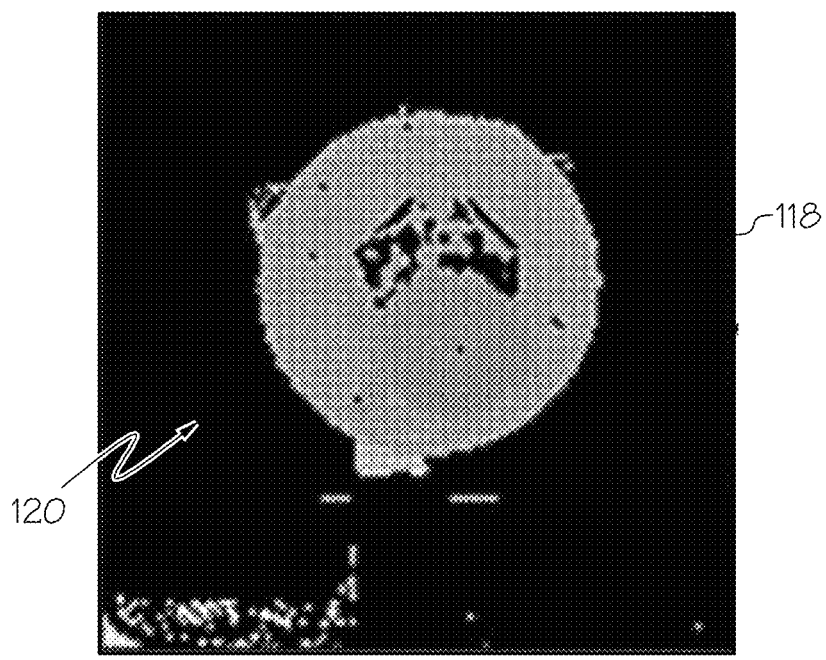
FIG. 3B is a diagram of an example of a 3D image of the object including a point cloud in accordance with an embodiment of the present disclosure.

In block 204, a 3D image of the object is captured by a 3D imaging sensor, such as 3D imaging sensor 116 in FIG. 1A. In accordance with an example, the 3D imaging sensor is a Light Detection and Ranging (LiDAR) imaging sensor or similar device for capturing the 3D image of the object. Referring also to FIG. 3B, FIG. 3B is a diagram of an example of a 3D image 118 of the object 104 including a 3D point cloud 120 in accordance with an embodiment of the present disclosure. The 3D point cloud 120 includes a multiplicity of points 122 (FIG. 1A) and includes a plurality of missing points 124 (FIG. 1A) or holes in the 3D point cloud that render the point cloud unusable for performing an operation with respect to the object. As previously described, each of the points 122 in the 3D point cloud 120 include 3D location information or XYZ coordinate information for a corresponding location 126 or point on the surface 128 of the object 104. As such, each point 122 in the 3D point cloud 120 includes depth information 132 associated with the corresponding location 126 or point on the object 104 and the 3D point cloud 120 includes or defines a 3D depth map 130, wherein each of the points 122 of the 3D point cloud 120 includes depth information 132 of a corresponding location 126 on the object 104.

In block 206, the 2D image and the 3D image are aligned. In accordance with an example, the 2D image and the 3D image are aligned using pre-acquired calibration information. The pre-acquired calibration information includes parameters of scale difference, translation offset, and rotation offset. An example of a procedure for aligning the 2D image and the 3D image is described in more detail in U.S. Pat. No. 9,972,067.

In block 208, a depth value is assigned from selected points 122 of the 3D point cloud 120 or 3D depth map 130 to a matching or corresponding pixel 112 on the 2D image plane 110. In another embodiment, a depth value is assigned from each of a predetermined number of points 122 in the 3D point cloud 120 of the 3D image 118 to respective matching or corresponding pixels 112 on the 2D image plane 110.

Figure 4C:
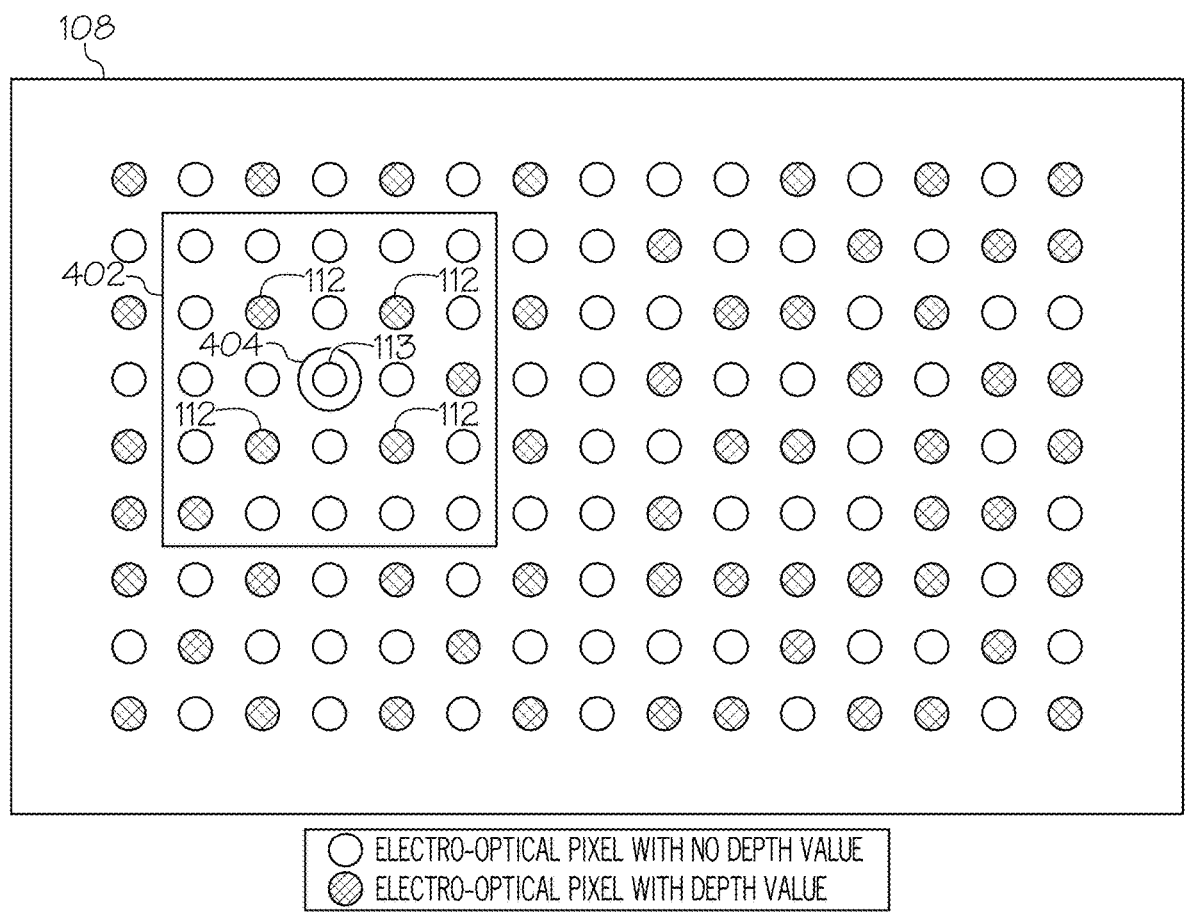
FIG. 4C is a diagram illustrating an example of generating an upsampled 3D point cloud in accordance with an embodiment of the present disclosure.
Figure 5:
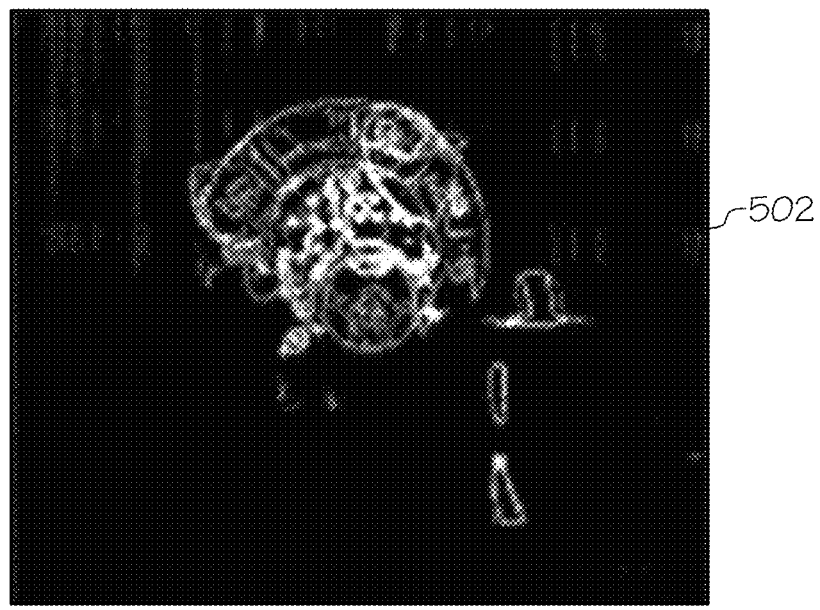
FIG. 5 is a diagram illustrating an example of an entropy image of the 2D image in FIG. 3A in accordance with an embodiment of the present disclosure.

In block 210, depth values for other pixels 113 (FIG. 4C) with no depth value in the 2D image 108 or on the 2D image plane 110 are interpolated from the 3D point cloud 120 of the 3D image 118. Referring also to FIGS. 4A-4C, FIG. 4A is a diagram illustrating an example of resolution of the 2D image 108 in accordance with an embodiment. FIG. 4B is a diagram illustrating an example of resolution of the 3D image 118 or 3D point cloud 120 compared to the resolution of the 2D image 108 in FIG. 4A in accordance with an embodiment of the present disclosure. The 2D image 108 or electro-optic image has a much higher resolution compared to the 3D image 118 or LiDAR image. FIG. 4C is a diagram illustrating an example of generating an upsampled 3D point cloud 148 (FIG. 1A) in accordance with an embodiment of the present disclosure. Interpolating depth values for other pixels 113 of the 2D image 108 or the 2D image plane 110 with no depth values includes using a predefined upsampling window 402 around a currently processed pixel 113, enclosed in circle 404, and performing upsampling using the entropy data of the pixels 112 of the 2D image 108 within the upsampling window 402 that have assigned depth values from the 3D image 118 or 3D depth map 130. The entropy data of the pixels 112 within the upsampling window 402 define the local entropies of the 2D image 108. In one aspect, the entropy data of the 2D image 108 is the measure of variance in pixel levels of an electro-optical pixel within the 2D image 108 relative to its neighboring pixels. For example, the entropy of an image can be represented as the degree of change or noise between one pixel and its neighboring pixels. In one aspect, regions with relatively low entropy represent regions of substantially uniform surfaces or smooth features. Regions of an image with high entropy represents regions of substantial variation between neighboring pixels within an image, which represents high noise and/or high variability in surface (e.g. resulting in an irregular surface). An entropy image 502 of the 2D image 108 or electro-optic (EO) image (FIG. 3A) is shown in FIG. 5.

Interpolating the depth values includes using the assigned depth values of pixels 112 neighboring the currently processed pixel 113 to determine a probable depth value for the currently processed pixel 113. An example of interpolating depth values for pixels 113 without an assigned depth value using neighboring pixels 112 that have an assigned depth value is described in U.S. Pat. No. 9,972,067 which is incorporated herein by reference.

In block 212, upsampling, by the processor, to generate an upsampled 3D point cloud 148 is generated from the 3D image 118 by upsampling the 3D point cloud 120 using local entropy data 149 of pixels 112 within the upsampling window 402. The upsampled 3D point cloud 148 includes filled points 150 for at least selected missing points 124 or holes in the 3D point cloud 120.

In block 214, multiple upsampled 3D point clouds 148 are generated from different viewpoints 138 or locations of the sensor platform 136 using entropy based upsampling. In block 216, the multiple upsampled 3D point clouds 148 are matched or registered and merged to generate the 3D model point cloud 102 of the object 104. In accordance with an embodiment, matching and merging the multiple upsampled 3D point clouds 148 includes performing registration and quantization or subsampling of the multiple upsampled 3D point clouds 148 using an iterative closest point process to generate the 3D model point cloud 102 or update 3D model point cloud of the object 104. An example of an iterative closest point process is described in "Efficient Variants of the ICP Algorithm" by Szymon Rusinkiewicz et al., 3-*D Digital Imaging and Modeling,* 2001. Similar to that previously described, point quantization or subsampling is performed by selecting every Nth point in the entire set of points 122 and removing other points 122. The total number of points 122 in the 3D point cloud 120 are reduced. Another (more computationally expensive) way of quantization is a grid-based method, where a 3D space is divided into a 3D cubic grid and a centroid point is calculated from all the points 122 within every unit grid cell. These centroid points are the quantized version of the original 3D point cloud 120.

In block 218, an operation is performed on the object 104 or with respect to the object 104 using the 3D model point cloud 102 or final updated 3D model point cloud if all 2D images and corresponding 3D images at all viewpoints 138 or locations of the sensor platform 136 have been captured and merged as described herein. Examples of the operation on the object 104 or with respect to the object 104 include but is not necessarily limited to performing an autonomous space rendezvous with another object or spacecraft; performing a proximity maneuver with respect to another object or spacecraft; performing a docking maneuver with respect to another object or spacecraft; or generating the 3D model point cloud of the object, wherein the object is a space object, such as an asteroid or other object in space.

Figure 6A:
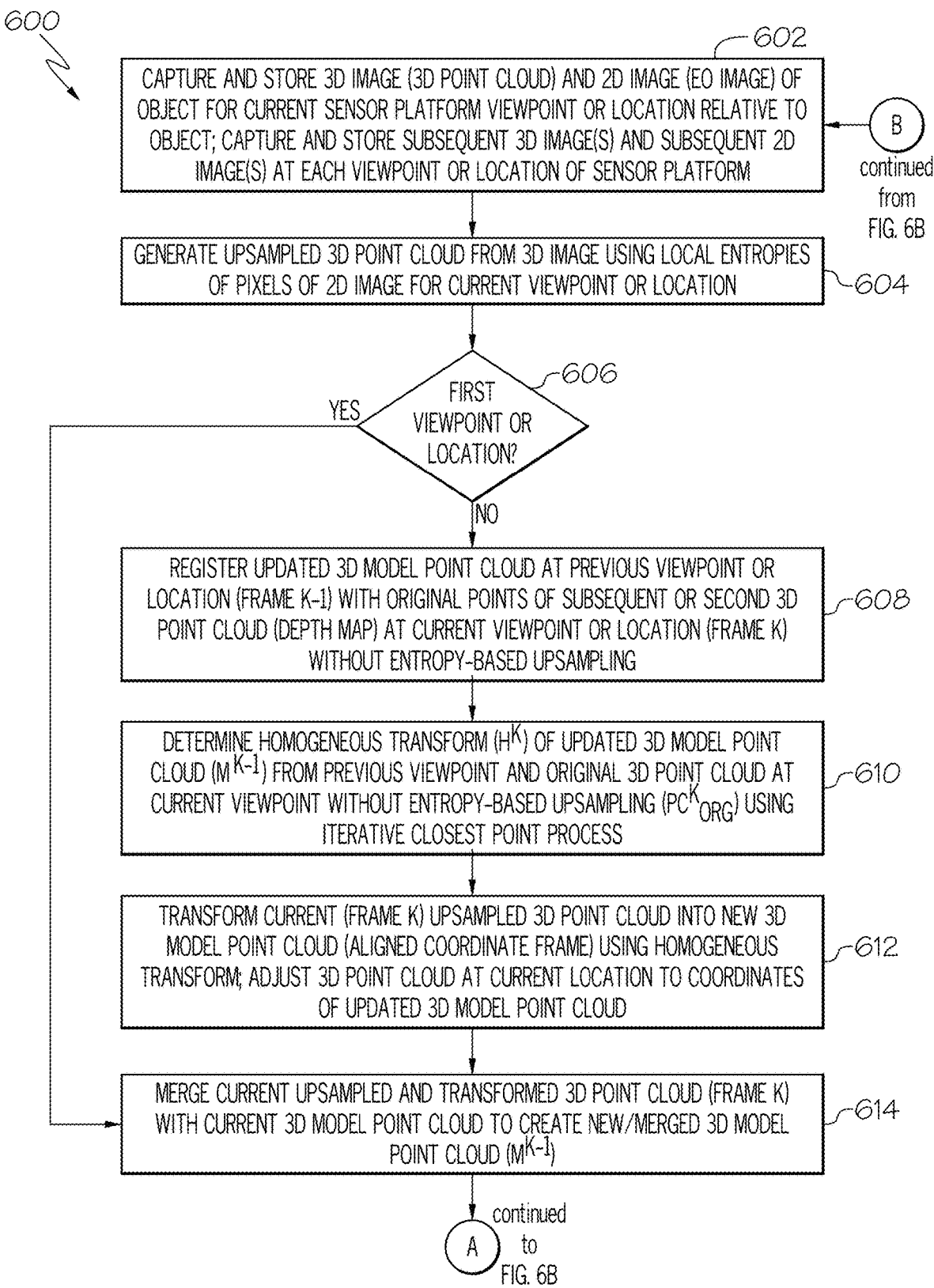
FIGS. 6A and 6B are a flow chart of an example of a method for generating a 3D model point cloud of an object in accordance with another embodiment of the present disclosure.
Figure 6B:
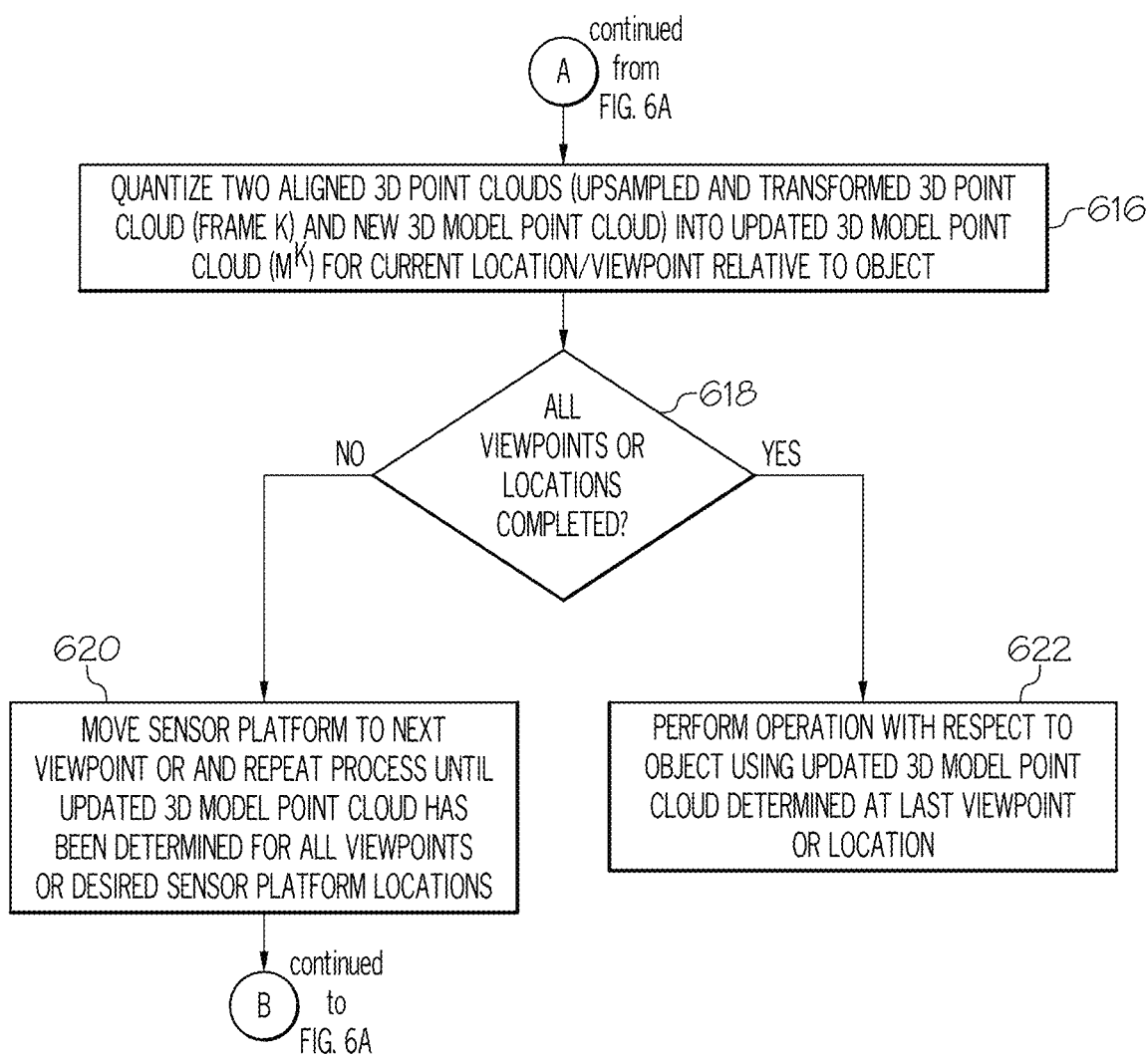
Figure 7:
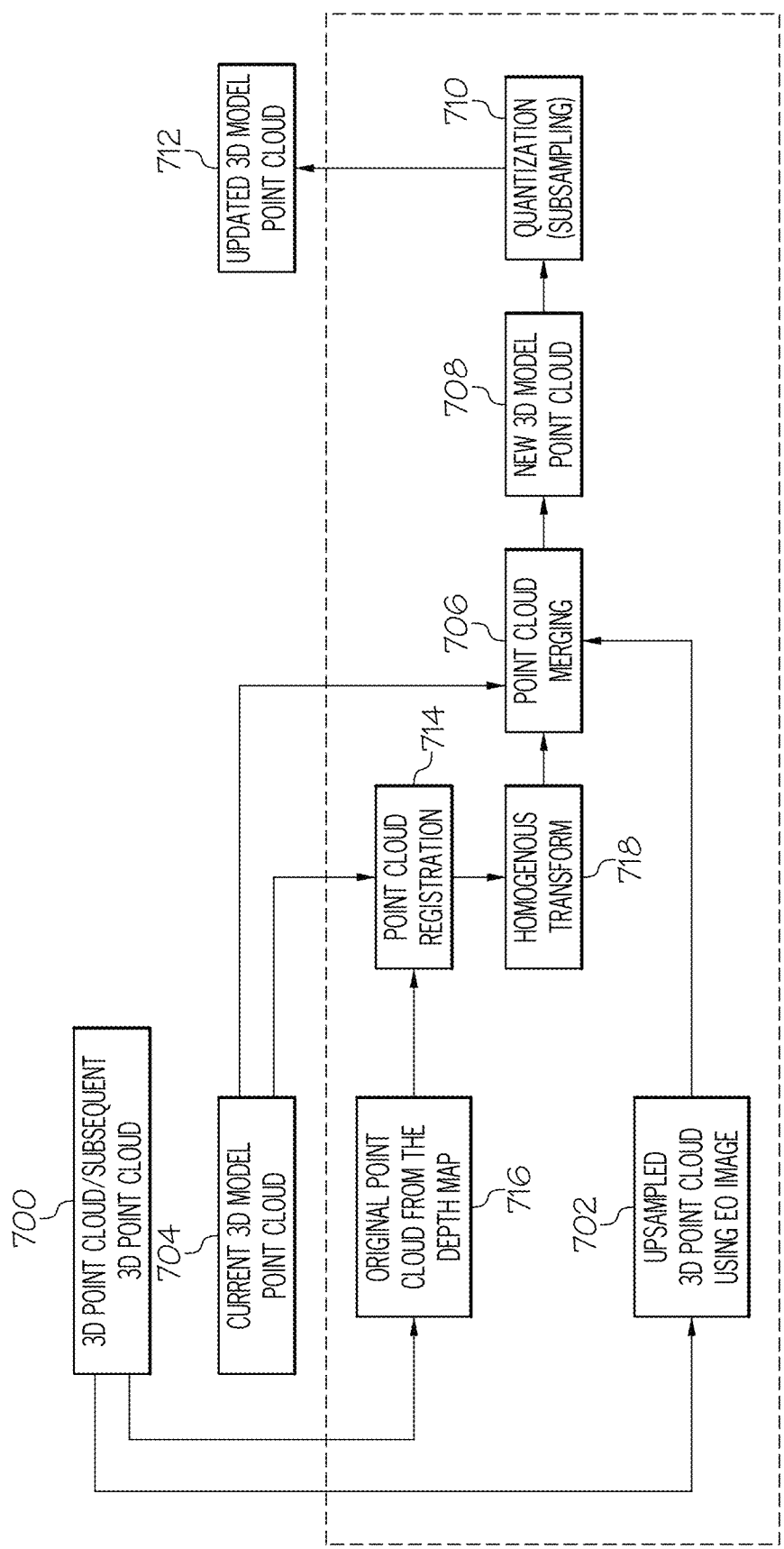
FIG. 7 is a block schematic diagram illustrating portions the exemplary method in FIGS. 6A and 6B.

Referring now to FIGS. 6A, 6B and FIG. 7, FIGS. 6A and 6B are a flow chart of an example of a method 600 for generating a 3D model point cloud of an object in accordance with another embodiment of the present disclosure. FIG. 7 is a block schematic diagram illustrating portions of the exemplary method 600 in FIGS. 6A and 6B. In accordance with an embodiment, the method 600 is embodied in and performed by the system 100 in FIGS. 1A and 1B. For example, the set of functions 145 includes the method 600. As described herein, generating the 3D model point cloud includes generating the 3D model point cloud using heterogeneous 2D and 3D sensor fusion in that data from the 2D imaging sensor 106 is combined or fused with data from the 3D imaging sensor 116 for the same viewpoint 138 or location of the sensor platform 136 for each viewpoint 138 or location of the sensor platform 136.

In block 602, a 2D image of the object is captured by a 2D imaging sensor and a 3D image of the object is captured by a 3D imaging sensor for a current sensor platform viewpoint or location relative to the object. The 2D image and the 3D image may be stored in a memory device, such as memory device 140 in FIG. 1A. The 2D image includes a 2D image plane. The 3D image of the object includes a 3D point cloud. The 3D point cloud includes a multiplicity of points and includes a plurality of missing points or holes in the 3D point cloud that render the 3D point cloud unusable for performing an operation with respect to the object.

In block 604, an upsampled 3D point cloud 702 (FIG. 7) is generated from the 3D image or 3D point cloud 700 using local entropy data of the 2D image, similar to that previously described, for the current viewpoint or location of the sensor platform to fill-in missing points or holes in the 3D point cloud.

In block 606, a determination is made whether the current viewpoint or location of the sensor platform is a first viewpoint or location. If the determination is made that this is the first viewpoint or location of the sensor platform, the method 600 advances to block 614. In block 614, the current 3D model point cloud 704 (FIG. 7) at the first viewpoint or first iteration is empty. As described in more detail herein for subsequent viewpoints or iterations a current 3D model point cloud 704 which is the updated 3D model point cloud 712 from a previous viewpoint of the sensor platform and the upsampled 3D point cloud 702 are merged 706 (FIG. 7) to create a new 3D model point cloud 708. In block 616, the new 3D model point cloud 708 is quantized 710 or subsampled to generate an updated 3D model point cloud 712 ($M^K$).

In block 618, a determination is made whether all viewpoints or locations of the sensor platform have been completed. If not, the method 600 will advance to block 620. In block 620, the sensor platform is moved to the next viewpoint or location and the method 600 will return to block 602 and the method 600 will proceed similar to that previously described. Accordingly, the process or method 600 is repeated until an updated 3D model point cloud 712 has been determined for all viewpoints or desired sensor platform locations. In block 602, a subsequent 2D image of the object is captured by the 2D imaging sensor at a current viewpoint or location of the sensor platform and a subsequent 3D image of the object is captured by the 3D imaging sensor at the current viewpoint or location. The subsequent 3D image of the object includes a subsequent 3D point cloud including missing points or holes.

In block 604, a current upsampled 3D point cloud 702 (FIG. 7) for the current viewpoint or location is generated from the subsequent 3D image and using local entropy data from the subsequent 2D image to fill at least some of the plurality of missing points or holes in the subsequent 3D point cloud.

In block 606, if the determination is made that this is not the first viewpoint or location of the sensor platform, the method 600 advances to block 608. In block 608, the current 3D model point cloud 704 (FIG. 7) which is the updated 3D model point cloud 712 from a previous viewpoint or location (Frame K−1) of the sensor platform is registered 714 with original points of the subsequent 3D point cloud (3D depth map) 716 at the current viewpoint or location (Frame K) of the sensor platform without entropy based upsampling.

In block 610, a homogeneous transform ($H^K$) 718 (FIG. 7) is determined from the current 3D model point cloud 704 which is the updated 3D model point cloud 712 from the previous viewpoint ($M^{K-1}$) or location of the sensor platform and the original points of a current 3D point cloud 716 at the current viewpoint or location without entropy-based upsampling ($PC_{ORG}^K$) using an iterative closest point process according to equation 1:

$$H^K = ICP(PC_{ORG}^K, M^{K-1})$$　　　　　　　Equation 1

In block 612, the current (Frame K) upsampled 3D point cloud 702 is transformed into a new 3D model point cloud 708 (aligned coordinate frame) using the homogeneous transform according to Equation 2:

$$\widehat{PC}_{UP}^K = H^K \cdot PC_{UP}^K$$　　　　　　　Equation 2

The current upsampled 3D point cloud 702 is adjusted to align or coordinate with the current 3D model point cloud 704 which is the updated 3D model point cloud 712 from the previous viewpoint or location of the sensor platform before merging 706 using the homogeneous transform 718.

In block 614, the updated 3D model point cloud 712 created at the previous viewpoint or location of the sensor platform, which is the current 3D model point cloud 704, and the current upsampled 3D point cloud 702 are merged 706 to create a current new 3D model point cloud 708.

In block 616, the current new 3D model point cloud 708 is quantized 710 to generate a current updated 3D model point cloud 712 for the current viewpoint or location of the sensor platform similar to that previously described.

As previously described, in block 618, a determination is made whether the 3D modeling process has been performed for all viewpoints or locations of the sensor platform. If so, the method 600 advances to block 622. In block 622, an operation is performed with respect to the object or an operation is performed on the object using a final updated 3D model point cloud 712 determined at the last viewpoint or location of the sensor platform. Examples of the operations include but are not necessarily limited to performing an autonomous space rendezvous with another object or spacecraft; performing a proximity maneuver relative to another object or spacecraft; performing a docking maneuver with another object or spacecraft; or generating the 3D model of the object. In accordance with an embodiment, the object is a space object, such as an asteroid, spacecraft or other space object.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for generating a three dimensional (3D) model of an object, comprising:
    capturing, by a two dimensional (2D) imaging sensor, a 2D image of the object, the 2D image comprising a 2D image plane;
    capturing, by a 3D imaging sensor, a 3D image of the object, the 3D image of the object comprising a 3D point cloud, the 3D point cloud comprising a multiplicity of points, and the 3D point cloud comprising a plurality of missing points or holes in the 3D point cloud;
    generating, by a processor, an upsampled 3D point cloud from the 3D image using local entropy data of the 2D image to fill at least some of the plurality of missing points or holes in the 3D point cloud;
    merging, by the processor, a 3D model point cloud from a previous viewpoint or location of a sensor platform and the upsampled 3D point cloud to create a new 3D model point cloud; and
    quantizing the new 3D model point cloud to generate an updated 3D model point cloud.

2. The method of claim 1, further comprising performing a process comprising:
    moving the sensor platform to a next viewpoint or location relative to the object, the sensor platform comprising the 2D imaging sensor and the 3D imaging sensor;

capturing, by the 2D imaging sensor, a subsequent 2D image of the object at a current viewpoint or location of the sensor platform;

capturing, by the 3D imaging sensor, a subsequent 3D image of the object at the current viewpoint or location of the sensor platform, the subsequent 3D image of the object comprising a subsequent 3D point cloud comprising a plurality of missing points or holes;

generating a current upsampled 3D point cloud for the current viewpoint or location of the sensor platform from the subsequent 3D image and using local entropy data of the subsequent 2D image to fill at least some of the plurality of missing points or holes in the subsequent 3D point cloud;

registering the updated 3D model point cloud from the previous viewpoint or location of the sensor platform with original points of the subsequent 3D point cloud without entropy based upsampling;

merging the updated 3D model point cloud from the previous viewpoint or location of the sensor platform and the current upsampled 3D point cloud to create a current new 3D model point cloud; and quantizing the current new 3D model point cloud to generate a current updated 3D model point cloud for the current viewpoint or location of the sensor platform.

3. The method of claim 2, further comprising repeating the process for each of a set of viewpoints or locations of the sensor platform.

4. The method of claim 3, wherein the process further comprises determining a homogeneous transform from the updated 3D model point cloud from the previous viewpoint or location of the sensor platform and the original points of a current 3D point cloud at the current viewpoint or location of the sensor platform without entropy-based upsampling using an iterative closest point process.

5. The method of claim 4, further comprising adjusting the current upsampled 3D point cloud to align or coordinate with the updated 3D model point cloud from the previous viewpoint or location of the sensor platform before merging using the homogeneous transform.

6. The method of claim 2, further comprising performing an operation with respect to the object.

7. The method of claim 6, wherein the performing the operation comprises one of:
   performing an autonomous space rendezvous;
   performing a proximity maneuver;
   performing a docking maneuver; or
   generating a 3D model of the object, wherein the object is a space object.

8. The method of claim 1, further comprising aligning the 2D image and the 3D image using pre-acquired calibration information.

9. The method of claim 8, further comprising assigning a depth value from each of a predetermined number of points in the 3D point cloud of the 3D image to respective matching pixels on the 2D image plane.

10. The method of claim 9, further comprising interpolating depth values for other pixels on the 2D image plane from the 3D point cloud of the 3D image.

11. The method of claim 10, wherein the interpolating comprises using a predefined upsampling window around a currently processed pixel, and performing upsampling using the local entropy data of the pixels of the 2D image within the predefined upsampling window.

12. A method for generating a three dimensional (3D) model of an object, comprising:

capturing, by a two dimensional (2D) imaging sensor, a 2D image of the object, the 2D image comprising a 2D image plane;

capturing, by a 3D imaging sensor, a 3D image of the object, the 3D image of the object comprising a 3D point cloud, the 3D point cloud comprising a multiplicity of points, and the 3D point cloud comprising a plurality of missing points or holes in the 3D point cloud, and the 3D point cloud comprising a 3D depth map, wherein each of the points of the 3D point cloud comprises depth information of a corresponding location on the object;

upsampling, by a processor, to generate an upsampled 3D point cloud from the 3D image using local entropy data of pixels within a predefined upsampling window, the upsampled 3D point cloud comprising filled points for at least selected missing points or holes in the 3D point cloud;

generating, by the processor, multiple upsampled 3D point clouds from different viewpoints or locations of a sensor platform comprising the 2D imaging sensor and the 3D imaging sensor; and merging, by the processor, the multiple upsampled 3D point clouds to generate a 3D model point cloud of the object.

13. The method of claim 12, further comprising:
aligning the 2D image and the 3D image;
assigning a depth value from selected points of the 3D point cloud or the 3D depth map to a matching pixel on the 2D image plane; and
interpolating depth values for other pixels on the 2D image plane within the predefined upsampling window.

14. The method of claim 12, wherein merging the multiple upsampled 3D point clouds comprises performing point cloud registration and quantization to generate the 3D model point cloud of the object.

15. The method of claim 12, wherein merging the multiple upsampled 3D point clouds comprises using an iterative closest point process to generate the 3D model point cloud of the object.

16. A system for generating a three dimensional (3D) model of an object, comprising:
a two dimensional (2D) imaging sensor for capturing a 2D image of the object, the 2D image comprising a 2D image plane;
a 3D imaging sensor for capturing a 3D image of the object, the 3D image of the object comprising a 3D point cloud, the 3D point cloud comprising a multiplicity of points, and the 3D point cloud comprising a plurality of missing points or holes in the 3D point cloud, and the 3D point cloud comprising a 3D depth map, wherein each of the points of the 3D point cloud comprises depth information of a corresponding location on the object;
a processor configured to perform a set of functions comprising:
upsampling to generate an upsampled 3D point cloud from the 3D image using local entropy data of pixels within a predefined upsampling window, the upsampled 3D point cloud comprising filled points for at least selected missing points or holes in the 3D point cloud;
generating multiple upsampled 3D point clouds from different viewpoints or locations of a sensor platform comprising the 2D imaging sensor and the 3D imaging sensor; and merging the multiple upsampled 3D point clouds to generate a 3D model point cloud of the object.

17. The system of claim 16, wherein the set of functions further comprises:
aligning the 2D image and the 3D image;
assigning a depth value from selected points of the 3D point cloud or the 3D depth map to a matching pixel on the 2D image plane; and
interpolating depth values for other pixels on the 2D image plane within a predefined upsampling window.

18. The system of claim 16, wherein the set of functions further comprises quantizing the 3D model point cloud to generate an updated 3D model point cloud.

19. The system of claim 16, wherein the 3D model point cloud of the object is used to perform an operation with respect to the object.

20. The system of claim 16, wherein the 2D imaging sensor comprises an electro-optical camera to capture a 2D electro-optical image and wherein the 3D imaging sensor comprises a 3D Light Detection and Ranging (LiDAR) imaging sensor.

\* \* \* \* \*